US012546536B2

(12) United States Patent
Yang et al.

(10) Patent No.: US 12,546,536 B2
(45) Date of Patent: Feb. 10, 2026

(54) VERTICAL-TYPE BAKING APPARATUS OF POSITIVE ELECTRODE MATERIAL FOR SECONDARY BATTERY

(71) Applicants: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

(72) Inventors: Choongmo Yang, Pohang-si (KR); Soon Cheol Hwang, Pohang-si (KR); Yooncheol Park, Pohang-si (KR); Keeyoung Jung, Pohang-si (KR)

(73) Assignees: POSCO, Pohang-si (KR); RESEARCH INSTITUTE OF INDUSTRIAL SCIENCE & TECHNOLOGY, Pohang-si (KR); POSCO CHEMICAL CO., LTD, Pohang-si (KR)

( * ) Notice: Subject to any disclaimer, the term of this patent is extended or adjusted under 35 U.S.C. 154(b) by 221 days.

(21) Appl. No.: 17/787,814

(22) PCT Filed: Dec. 1, 2020

(86) PCT No.: PCT/KR2020/017411
§ 371 (c)(1),
(2) Date: Jun. 21, 2022

(87) PCT Pub. No.: WO2021/125628
PCT Pub. Date: Jun. 24, 2021

(65) Prior Publication Data
US 2023/0053769 A1    Feb. 23, 2023

(30) Foreign Application Priority Data

Dec. 20, 2019    (KR) .................. 10-2019-0171874

(51) Int. Cl.
*F27B 9/14*    (2006.01)
*F27B 9/12*    (2006.01)
(Continued)

(52) U.S. Cl.
CPC ................ *F27B 9/142* (2013.01); *F27B 9/26* (2013.01); *F27B 9/34* (2013.01); *F27B 9/36* (2013.01); *F27B 9/38* (2013.01); *F27B 2009/124* (2013.01)

(58) Field of Classification Search
CPC .... F27B 9/142; F27B 9/26; F27B 9/34; F27B 9/36; F27B 9/38; F27B 2009/124
See application file for complete search history.

(56) References Cited

U.S. PATENT DOCUMENTS 2,591,259 A * 4/1952 Hess ..................... C21D 9/005
414/797.9
5,406,582 A  4/1995 Du Plessis
(Continued)

FOREIGN PATENT DOCUMENTS

CN  203758234 U  8/2014
JP  47-43438 A  11/1972
(Continued)

OTHER PUBLICATIONS

English translation of JPH-10238953-A, dated Mar. 22, 2024 (Year: 2024).*

(Continued)

*Primary Examiner* — Edelmira Bosques
*Assistant Examiner* — Brett Peterson Mallon
(74) *Attorney, Agent, or Firm* — Sughrue Mion, PLLC

(57) ABSTRACT

A vertical-type firing apparatus for a positive electrode material for a secondary battery, for vertically moving and firing the positive electrode material for the secondary battery, comprises: a vertical-type firing furnace including (Continued)

an exhaust part, an air supply part, and a firing space positioned between the exhaust part and the air supply part; and a heater for heating the firing space of the vertical-type firing furnace, wherein the firing space includes a temperature-raising space, a cooling space, and a temperature-maintaining space located between the temperature-raising space and the cooling space, and the temperature of the temperature-maintaining space is higher than the temperature of the temperature-raising space and the temperature of the cooling space.

4 Claims, 5 Drawing Sheets

(51) Int. Cl.
   *F27B 9/26* (2006.01)
   *F27B 9/34* (2006.01)
   *F27B 9/36* (2006.01)
   *F27B 9/38* (2006.01)

(56) References Cited

U.S. PATENT DOCUMENTS 6,066,290 A * 5/2000 Dennis ............... F27D 21/00
                                                        266/249
6,407,368 B1   6/2002 Hsu et al.

FOREIGN PATENT DOCUMENTS

| JP | 1-121681 A | 5/1989 |
| JP | 4-193767 A | 7/1992 |
| JP | 05-19897 U | 3/1993 |
| JP | 09-79762 A | 3/1997 |
| JP | 10-170157 A | 6/1998 |
| JP | 10-238953 A | 9/1998 |
| JP | H-10238953 A * | 9/1998 |
| JP | 2003294374 A1 * | 10/2003 |
| JP | 3575582 B2 | 10/2004 |
| JP | 2010121856 A * | 6/2010 |
| JP | 2019-99406 A | 6/2019 |
| JP | 2019099406 A * | 6/2019 |
| KR | 10-1997-0007270 A | 2/1997 |
| KR | 10-2001-0097800 A | 11/2001 |
| KR | 20-0468934 Y | 9/2013 |
| KR | 10-2017-0035787 A | 3/2017 |
| KR | 10-1987940 A | 6/2019 |
| KR | 10-2021-0079758 A | 6/2021 |
| WO | 2004/038074 A1 | 5/2004 |
| WO | WO-2019054296 A1 * | 3/2019 ............ H01M 4/525 |

OTHER PUBLICATIONS

English translation of JP-2019099406-A, dated Mar. 22, 2024 (Year: 2024).*
English translation of JP-2010121856-A, dated Mar. 22, 2024 (Year: 2024).*
English translation of JP-2003294374-A1, dated Dec. 2, 2024 (Year: 2024).*
English translation of WO-2019054296-A1, dated Jul. 7, 2025 (Year: 2025).*
International Search Report of PCT/KR2020/017411 dated Feb. 26, 2021 [PCT/ISA/210].
Written Opinion of PCT/KR2020/017411 dated Feb. 26, 2021 [PCT/ISA/237].
Office Action issued Aug. 1, 2023 in Japanese Application No. 2022-538298.
Office Action dated Aug. 7, 2023, of the corresponding Chinese Patent Application No. 202080088841.6.
Extended European Search Report dated Dec. 21, 2023 in European Application No. 20903136.8.
Office Action issued Jan. 30, 2024 in Japanese Application No. 2022-538298.

* cited by examiner

VERTICAL-TYPE BAKING APPARATUS OF POSITIVE ELECTRODE MATERIAL FOR SECONDARY BATTERY

CROSS REFERENCE TO RELATED APPLICATIONS

This application is a National Stage of International Application No. PCT/KR2020/017411 filed on Dec. 1, 2020, claiming priority based on Korean Patent Application No. 10-2019-0171874 filed on Dec. 20, 2019, the entire disclosures of which are incorporated herein by reference.

TECHNICAL FIELD

The present disclosure relates to a vertical-type firing apparatus of a positive electrode material for a secondary battery.

BACKGROUND ART

In general, a firing apparatus of a positive electrode material for a secondary battery is an apparatus for firing a sagger accommodating the positive electrode material at a temperature of 400° C. to 1100° C. according to characteristics of the material in a firing furnace.

In a firing process of the positive electrode material for the secondary battery using the firing apparatus, water vapor and carbon dioxide gas are generated from the positive electrode material accommodated in the sagger. The carbon dioxide gas has a greater molecular weight than oxygen or air used to control the atmosphere of the firing furnace, and thus is difficult to be discharged to the outside of the sagger. There is a problem in that the carbon dioxide gas remaining inside the sagger causes a chemical reaction with lithium oxide on the surface of a positive electrode active material fired from the positive electrode material, resulting in generation of lithium carbonate.

A conventional firing apparatus of a positive electrode material for a secondary battery discharged the water vapor and the carbon dioxide gas generated from the positive electrode material accommodated in the sagger to the outside of the sagger, and for a firing reaction, supplied gases such as oxygen and air to a lower portion, an upper portion, and side surfaces of a firing space in which the sagger moving in one direction is positioned.

However, in the conventional firing apparatus of the positive electrode material for the secondary battery, the cross-section of a window of the sagger through which gas flows into the sagger from the outside of the sagger is very small compared to the cross-section of the firing space in which the sagger is positioned, causing a problem in that only a very small amount of the total flow rate of gas passing through the cross-section of the firing space flows into the sagger.

DISCLOSURE

An exemplary embodiment of the present invention has been made in an effort to provide a vertical-type firing apparatus of a positive electrode material for a secondary battery, having advantages of improving the discharge of carbon dioxide gas generated from the positive electrode material for the secondary battery and improving the firing reaction of the positive electrode material for the secondary battery by increasing the flow rate of gas supplied to the positive electrode material for the secondary battery.

An exemplary embodiment of the present invention provides a vertical-type firing apparatus for a positive electrode material for a secondary battery for firing the positive electrode material for the secondary battery by moving the positive electrode material in a vertical direction, the vertical-type firing apparatus including a vertical-type firing furnace comprising an exhaust part positioned in an upper portion and through which internal gas is exhausted, an air supply part positioned in a lower portion and through which external gas is supplied, and a firing space positioned between the exhaust part and the air supply part and extending in the vertical direction, and a heater configured to heat the firing space in the vertical-type firing furnace, wherein the positive electrode material for the secondary battery is put into the exhaust part and discharged from the air supply part through the firing space, the firing space comprises a temperature-raising space communicating with the exhaust part, a cooling space communicating with the air supply part, and the temperature-maintaining space communicating with the temperature-raising space and the cooling space between the temperature-raising space and the cooling space, and temperature of the temperature-maintaining space is higher than temperature of the temperature-raising space and temperature of the cooling space.

The heater may heat only the temperature-maintaining space.

The vertical-type firing furnace may further include a rectangular pillar-shaped heat insulating material forming the air supply part, the exhaust part, and the firing space, and the heater may be positioned inside the rectangular pillar-shaped heat insulating material to correspond to the temperature-maintaining space.

The positive electrode material for the secondary battery may be accommodated in a plurality of saggers stacked in the vertical direction in the firing space, and the vertical-type firing apparatus may further include an input part adjacent to the exhaust part and configured to put a first sagger positioned on the uppermost layer among the plurality of saggers into the exhaust part, and a discharge part adjacent to the air supply part and configured to discharge a second sagger positioned on the lowermost layer among the plurality of saggers from the air supply part.

The input part may include a first roller configured to transfer the first sagger to the discharge part, and a first pusher configured to push the first sagger on the first roller to the exhaust part, and the discharge part may include a stopper configured to support a third sagger positioned on the second sagger among the plurality of saggers in the firing space, a supporter configured to support the second sagger discharged from the air supply part, a second roller adjacent to the supporter, and a second pusher configured to push the second sagger on the supporter onto the second roller.

The vertical-type firing furnace may further include a cylinder-type heat insulating material forming the air supply part, the exhaust part, and the firing space, and an inner wall facing the firing space in the cylinder-type heat insulating material, and the heater is positioned inside the inner wall to correspond to the temperature-maintaining space.

The positive electrode material for the secondary battery may come into contact with the inner wall in the firing space.

A diameter of the firing space may be greater than the diameter of the exhaust part and the diameter of the air supply part.

The positive electrode material for the secondary battery may be in the form of granules or briquettes.

According to an exemplary embodiment, there is provided a vertical-type firing apparatus of a positive electrode material for a secondary battery, which improves the discharge of carbon dioxide gas generated from the positive electrode material for the secondary battery and improves the firing reaction of the positive electrode material for the secondary battery by increasing the flow rate of gas supplied to the positive electrode material for the secondary battery.

MODE FOR INVENTION

Figure 1:
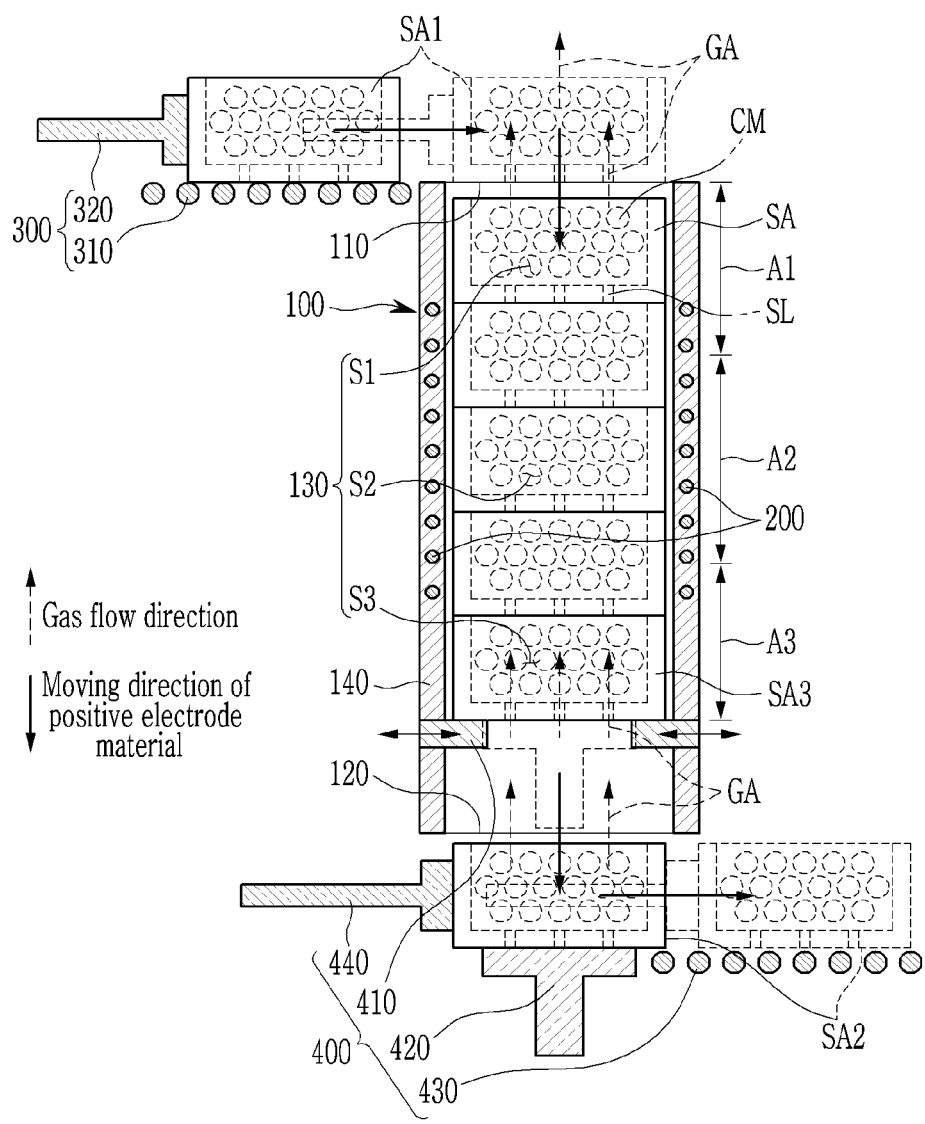
FIG. 1 is a drawing illustrating a vertical-type firing apparatus of a positive electrode material for a secondary battery according to an exemplary embodiment.

Hereinafter, with reference to the accompanying drawings, exemplary embodiments of the present invention will be described in detail so that a person of an ordinary skill in the art to which the present invention pertains can easily implement the same. The present invention may be embodied in several different forms and is not limited to exemplary embodiments described herein.

In order to clearly explain the present invention, parts irrelevant to the description are omitted, and the same reference numerals are assigned to the same or similar constituent elements throughout the specification.

In addition, unless explicitly described to the contrary, the word "comprise" and variations such as "comprises" or "comprising" will be understood to imply the inclusion of stated elements but not the exclusion of any other elements.

Hereinafter, a vertical-type firing apparatus of a positive electrode material for a secondary battery according to an exemplary embodiment will be described with reference to FIGS. 1 to 3.

FIG. 1 is a drawing illustrating the vertical-type firing apparatus of the positive electrode material for the secondary battery according to an exemplary embodiment.

Referring to FIG. 1, the vertical-type firing apparatus of the positive electrode material for the secondary battery according to an exemplary embodiment heats a plurality of saggers SA accommodating a positive electrode material CM for a secondary battery in the form of granules or briquettes while moving the saggers SA in a vertical direction in a firing space 130 in a vertical-type firing furnace 100, so as to fire the positive electrode material CM for the secondary battery accommodated in the plurality of saggers SA by moving the positive electrode material CM in a vertical direction. A through-type slit SL through which gas GA moving from a lower portion to an upper portion of the firing space 130 passes is formed on the bottoms of the plurality of saggers SA.

In an exemplary embodiment, the plurality of saggers SA are stacked in multiple layers and move in the vertical direction in the firing space 130 of the vertical-type firing furnace 100. While not limited thereto, one sagger SA may be moved as a single layer in the vertical direction in the firing space 130 of the vertical-type firing furnace 100.

The vertical-type firing apparatus of the positive electrode material for the secondary battery includes a temperature-raising section A1, a temperature-maintaining section A2, and a cooling section A3.

The temperature-raising section A1 is a section in which the temperature is raised to a predetermined temperature (for example, 400° C. to 1100° C.) according to characteristics of the positive electrode material CM for the secondary battery accommodated in the plurality of saggers SA.

The temperature-maintaining section A2 is a section for maintaining the predetermined temperature.

The cooling section A3 is a section cooled from the predetermined temperature.

The vertical-type firing apparatus of the positive electrode material for the secondary battery includes the vertical-type firing furnace 100, a heater 200, an input part 300, and a discharge part 400.

The vertical-type firing furnace 100 includes an exhaust part 110, an air supply part 120, the firing space 130, and a rectangular pillar-shaped heat insulating material 140.

The exhaust part 110 is positioned at the upper portion of the vertical-type firing furnace 100 and the internal gas GA located in the firing space 130 inside the vertical-type firing furnace 100 is exhausted to the outside through the exhaust part 110.

The positive electrode material CM for the secondary battery accommodated in the plurality of saggers SA is put into the firing space 130 through the exhaust part 110. The internal gas GA exhausted from the firing space 130 through the exhaust part 110 may further include carbon dioxide gas and water vapor discharged from the positive electrode material CM for the secondary battery accommodated in the plurality of saggers SA in addition to the air and oxygen gas supplied to the firing space 130 through the air supply part 120, but is not limited thereto.

The air supply part 120 is positioned at the lower portion of the vertical-type firing furnace 100, and external gas GA is supplied to the firing space 130 in the vertical-type firing furnace 100 through the air supply part 120. The positive electrode material CM for the secondary battery accommodated in the plurality of saggers SA is discharged from the firing space 130 through the air supply part 120. The positive electrode material CM for the secondary battery is put into the exhaust part 110 and discharged through the air supply part 120 by passing through the firing space 130. The external gas GA is put into the air supply part 120 and discharged through the exhaust part 110 by passing through the firing space 130. The external gas GA supplied to the firing space 130 through the air supply part 120 may include air and oxygen gas, but is not limited thereto.

The firing space 130 communicates with the exhaust part 110 and the air supply part 120 between the exhaust part 110 and the air supply part 120. The firing space 130 extends in a vertical direction between the exhaust part 110 and the air supply part 120. The firing space 130 is a space in which the plurality of saggers SA accommodating the positive electrode material CM for the secondary battery are moved in the vertical direction, and includes the temperature-raising space S1, the temperature-maintaining space S2, and the cooling space S3 sequentially communicating from the upper portion to the lower portion in the vertical direction.

The temperature-raising space S1 is adjacent to the exhaust part 110 to communicate with the exhaust part 110.

The temperature-maintaining space S2 communicates with the temperature-raising space S1 and the cooling space S3 between the temperature-raising space S1 and the cooling space S3.

The temperature of the temperature-maintaining space S2 is higher than the temperature of the temperature-raising space S1 and the temperature of the cooling space S3.

The cooling space S3 is adjacent to the air supply part 120 to communicate with the air supply part 120.

In the firing space 130, the plurality of saggers SA accommodating the positive electrode material CM for the secondary battery are stacked in a vertical direction to be moved in the vertical direction. In the firing space 130, the plurality of saggers SA move from the upper portion to the lower portion of the firing space 130, and the gas moves from the lower portion to the upper portion of the firing space 130. In other words, the positive electrode material CM for the secondary battery accommodated in the plurality of saggers SA sequentially moves though the temperature-raising space S1, the temperature-maintaining space S2, and the cooling space S3 in a vertical direction in the firing space 130, and the gas GA sequentially moves through the cooling space S3, the temperature-maintaining space S2, and the temperature-raising space S1 in a vertical direction in the firing space 130.

The rectangular pillar-shaped heat insulating material 140 forms the air supply part 120, the exhaust part 110, and the firing space 130. The exhaust part 110 is formed at the upper portion of the rectangular pillar-shaped heat insulating material 140, the air supply part 120 is formed at the lower portion of the rectangular pillar-shaped heat insulating material 140, and the firing space 130 is formed inside the rectangular pillar-shaped heat insulating material 140. The rectangular pillar-shaped heat insulating material 140 has a rectangular pillar shape, but not limited thereto. It may also have a cylinder shape or a polygonal pillar shape.

The heater 200 heats the firing space 130 of the vertical-type firing furnace 100. The heater 200 may be positioned to correspond to the temperature-maintaining space S2 to heat only the temperature-maintaining space S2, but is not limited thereto. The heater 200 is positioned inside the rectangular pillar-shaped heat insulating material 140 corresponding to the temperature-maintaining space S2.

Figure 2:
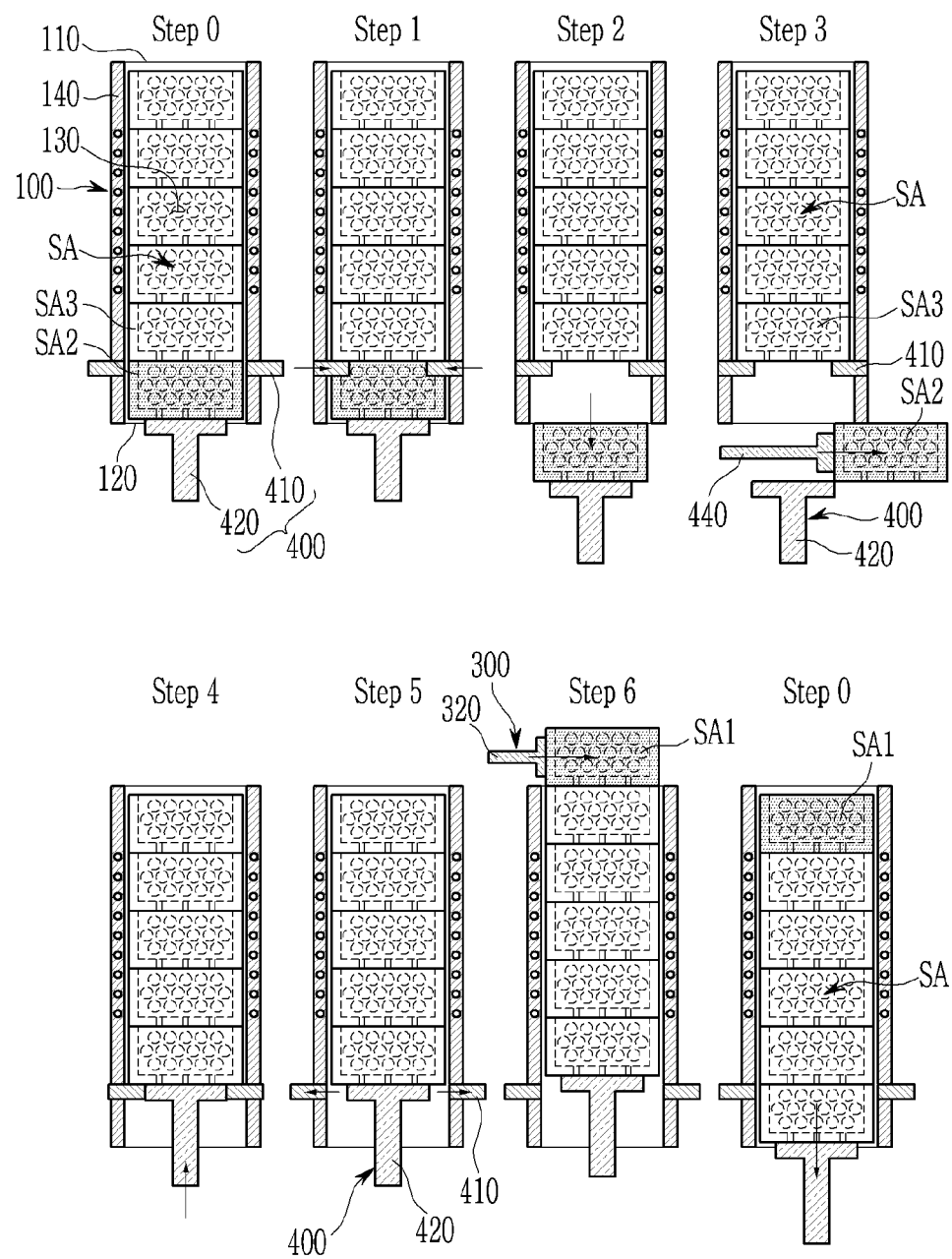
FIG. 2 shows drawings illustrating that saggers accommodating the positive electrode material for the secondary battery are put into and discharged from the vertical-type firing apparatus of the positive electrode material for the secondary battery according to an exemplary embodiment shown in FIG. 1.

FIG. 2 shows drawings illustrating that the saggers accommodating the positive electrode material for the secondary battery are put into and discharged from the vertical-type firing apparatus of the positive electrode material for the secondary battery according to an exemplary embodiment shown in FIG. 1.

Referring to FIGS. 1 and 2, the input part 300 is adjacent to the exhaust part 110, and a first sagger SA1 positioned on the uppermost layer among the plurality of saggers SA is put into the exhaust part 110.

The input part 300 includes a first roller 310 and a first pusher 320.

The first roller 310 is adjacent to the exhaust part 110 and transfers the first sagger SA1 to the exhaust part 110.

The first pusher 320 pushes the first sagger SA1 positioned on the first roller 310 to the exhaust part 110.

The input part 300 is not limited to the above-described structure, and may have various structures in that the first sagger SA1 positioned on the uppermost layer among the plurality of saggers SA is put into the exhaust part 110.

The discharge part 400 is adjacent to the air supply part 120 to discharge a second sagger SA2 positioned on the lowest layer among the plurality of saggers SA from the air supply part 120.

The discharge part 400 includes a stopper 410, a supporter 420, a second roller 430, and a second pusher 440.

The stopper 410 supports a third sagger SA3 positioned on the second sagger SA2 among the plurality of saggers SA in the firing space 130. The stopper 410 may be mounted in the firing space 130 of the vertical-type firing furnace 100, but is not limited thereto.

The supporter 420 supports the second sagger SA2 discharged from the air supply part 120.

The second roller 430 is adjacent to the supporter 420 to transfer the second sagger SA2 transferred by the second pusher 440 to the outside.

The second pusher 440 pushes the second sagger SA2 on the supporter 420 onto the second roller 430.

The discharge part 400 is not limited to the above-described structure, and may have various structures for discharging the second sagger SA2 positioned on the lowest layer among the plurality of saggers SA from the air supply part 120.

Figure 3:
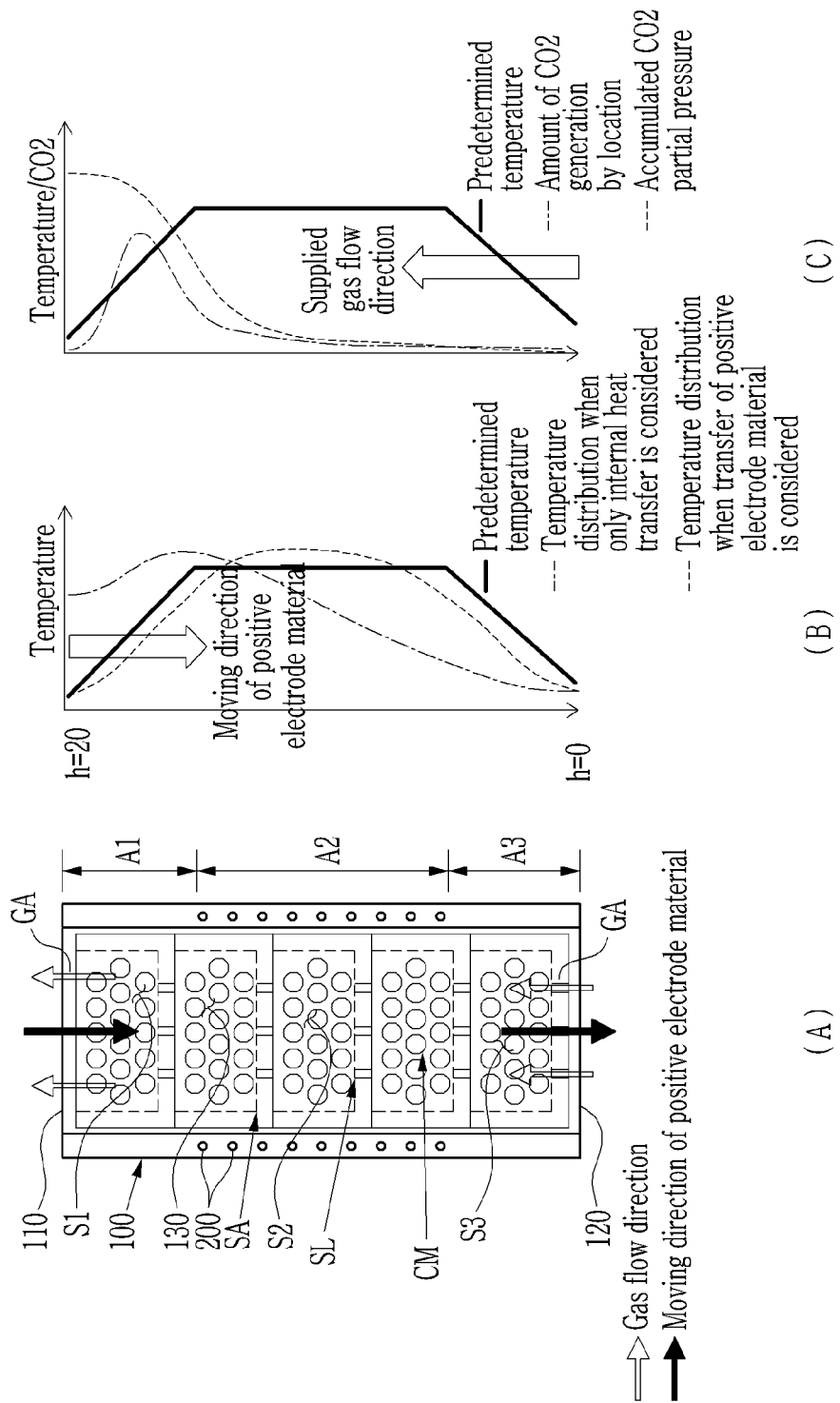
FIG. 3 shows a drawing and graphs illustrating an effect of a vertical-type firing apparatus of a positive electrode material for a secondary battery according to an exemplary embodiment.

FIG. 3 shows a drawing and graphs for describing an effect of the vertical-type firing apparatus of the positive electrode material for the secondary battery according to an exemplary embodiment. (A) of FIG. 3 is a drawing illustrating the vertical-type firing furnace in the vertical-type firing apparatus of the positive electrode material for the secondary battery according to an exemplary embodiment. (B) of FIG. 3 is a graph showing the temperature according to the vertical height of the firing space of the vertical-type firing furnace, wherein the x-axis represents the temperature, and the y-axis represents the vertical height of the firing space of the vertical-type firing furnace. (C) of FIG. 3 is a graph showing the temperature and carbon dioxide concentration according to the vertical height of the firing space of the vertical-type firing furnace, wherein the x-axis represents the temperature and carbon dioxide concentration, and the y-axis represents the vertical height of the firing space of the vertical-type firing furnace.

Referring to (A) of FIG. 3, the positive electrode material CM for the secondary battery in the vertical-type firing furnace 100 is charged, in the form of granules, in the plurality of saggers SA stacked in the vertical direction in the firing space 130 and moves from the upper portion to the lower portion of the firing space 130. The gas GA supplied through the air supply part 120 of the vertical-type firing furnace 100 moves from the lower portion to the upper portion of the firing space 130 to be exhausted from the exhaust part 110. Since the gas GA moving from the lower portion to the upper portion of the firing space 130 moves in an almost closed form through the through-type slit SL formed on the bottom of the plurality of saggers SA, the process of firing the positive electrode material CM for the secondary battery accommodated in the plurality of saggers (SA) is completed only with very low flow rate of gas. Such reduction in gas supply leads not only to reduction in gas cost but also reduction in energy cost for heating the gas. In addition, since most of the gas GA supplied to the firing space 130 passes around the positive electrode material CM for the secondary battery, carbon dioxide gas generated in the positive electrode material CM for the secondary battery is easily discharged from the sagger SA. Thus, it is favorable to control the firing reaction, thereby ultimately bringing improvement in the firing quality of the positive electrode material CM for the secondary battery. In addition, due to the favorable environment for the firing reaction, derived are the effects such as an increase in the charging amount of the positive electrode material CM for the secondary battery accommodated inside the sagger (SA) and reduction in firing time, thereby reducing firing cost due to the increase in firing productivity.

Referring to (A) and (B) of FIG. 3, even if the heater 200 heats only the temperature-maintaining space S2 in the firing space 130 corresponding to the temperature-maintaining space S2, the temperature of the temperature-raising space 51 may further be increased compared to the temperature-maintaining space S2 due to heat transfer inside the firing space 130 by the gas GA moving from the lower portion to the upper portion of the firing space 130 (temperature distribution only when internal heat transfer is considered). However, a heat balance is generated in the firing space 130 by the positive electrode material CM for the secondary battery moving from the upper portion to the lower portion of the firing space 130 in the opposite direction to the moving direction of the gas GA, so as to form a temperature profile similar to the predetermined temperature in the firing space 130 (temperature distribution only when the transfer of the positive electrode material is considered).

Referring to (A), (B), and (C) of FIG. 3, due to the temperature profile similar to the predetermined temperature formed in the firing space 130, most of the carbon dioxide gas is generated from the positive electrode material CM for the secondary battery in the temperature-raising space S1 positioned at the upper portion of the firing space 130, and the carbon dioxide gas is easily discharged to the upper portion of the firing space 130.

In other words, there is provided a vertical-type firing apparatus of a positive electrode material for a secondary battery, which improves discharge of carbon dioxide gas generated from the positive electrode material for the secondary battery and also improves firing reaction of the positive electrode material for the secondary battery by increasing the flow rate of gas supplied to the positive electrode material for the secondary battery.

In addition, there is provided a vertical-type firing apparatus of a positive electrode material for a secondary battery, which fires the positive electrode material for the secondary battery with improved firing quality.

In addition, there is provided a vertical-type firing apparatus of a positive electrode material for a secondary battery, which brings an increase in the charging amount of the positive electrode material for the secondary battery fired in a firing space as well as an increase in the firing productivity due to reduction in the firing time while the firing cost is reduced.

Hereinafter, a vertical-type firing apparatus of a positive electrode material for a secondary battery according to another exemplary embodiment will be described with reference to FIGS. 4 and 5. Hereinafter, parts different from the vertical-type firing apparatus of the positive electrode material for the secondary battery according to the above-described exemplary embodiment will be described.

Figure 4:
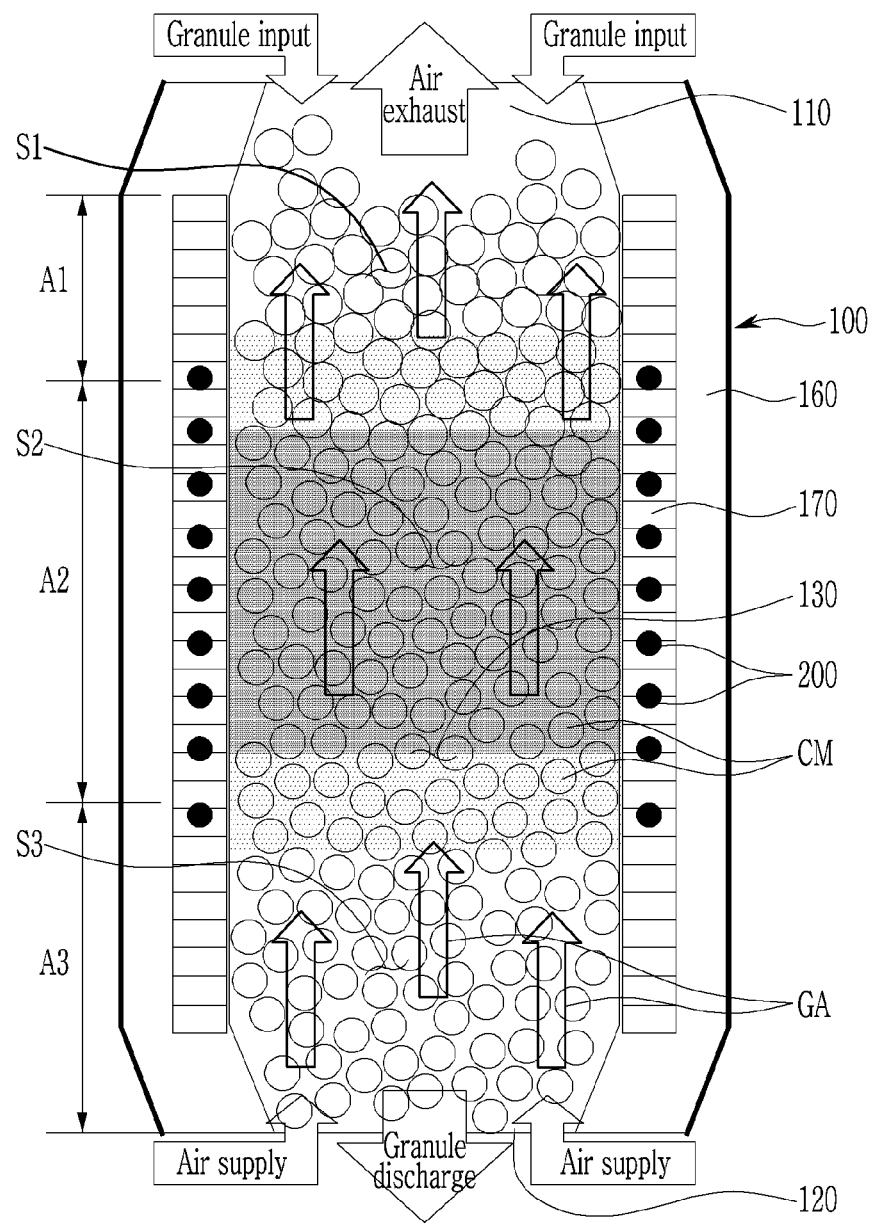
FIG. 4 is a drawing illustrating a vertical-type firing apparatus of a positive electrode material for a secondary battery according to another exemplary embodiment.

FIG. 4 is a drawing illustrating the vertical-type firing apparatus of the positive electrode material for the secondary battery according to another exemplary embodiment.

Referring to FIG. 4, the vertical-type firing apparatus of the positive electrode material for the secondary battery according to another exemplary embodiment moves the positive electrode material CM for the secondary battery in the form of granules or briquettes in the firing space 130 of the vertical-type firing furnace 100 in the vertical direction to fire the positive electrode material CM. The positive electrode material CM for the secondary battery comes in contact with the vertical-type firing furnace 100.

The vertical-type firing apparatus of the positive electrode material for the secondary battery includes a temperature-raising section A1, a temperature-maintaining section A2, and a cooling section A3.

The temperature-raising section A1 is a section in which the temperature is raised to a predetermined temperature (for example, 400° C. to 1100° C.) based on the characteristics of the positive electrode material CM for the secondary battery moving in the vertical direction in the firing space 130.

The temperature-maintaining section A2 is a section for maintaining the predetermined temperature.

The cooling section A3 is a section cooled from the predetermined temperature.

The vertical-type firing apparatus of the positive electrode material for the secondary battery includes the vertical-type firing furnace 100 and the heater 200.

The vertical-type firing furnace 100 includes the exhaust part 110, the air supply part 120, the firing space 130, a cylinder-type heat insulating material 160, and an inner wall 170.

The exhaust part 110 is positioned at the upper portion of the vertical-type firing furnace 100, and the internal gas GA present in the firing space 130 in the vertical-type firing furnace 100 is discharged through the exhaust part 110. The positive electrode material CM for the secondary battery is put into the firing space 130 through the exhaust part 110. The internal gas GA exhausted from the firing space 130 through the exhaust part 110 may further include carbon dioxide gas and water vapor discharged from the positive electrode material CM for the secondary battery in addition to air and oxygen gas supplied to the firing space 130 through the air supply part 120, but is not limited thereto.

The air supply part 120 is positioned at the lower portion of the vertical-type firing furnace 100, and the external gas GA is supplied to the firing space 130 in the vertical-type firing furnace 100 through the air supply part 120.

The positive electrode material CM for the secondary battery is discharged from the firing space 130 through the air supply part 120. The positive electrode material CM for the secondary battery is put into the exhaust part 110 to be discharged to the air supply part 120 by passing through the firing space 130. The external gas GA is put into the air supply part 120 to be discharged to the exhaust part 110 by passing through the firing space 130. The external gas GA supplied to the firing space 130 through the air supply part 120 may include air and oxygen gas, but is not limited thereto.

The firing space 130 communicates with the exhaust part 110 and the air supply part 120 between the exhaust part 110 and the air supply part 120. The firing space 130 extends in a vertical direction between the exhaust part 110 and the air supply part 120. The firing space 130 is a space in which the positive electrode material CM for the secondary battery is moved in a vertical direction, and includes the temperature-raising space S1, the temperature-maintaining space S2, and the cooling space S3 sequentially communicating from the upper portion to the lower portion in the vertical direction.

The temperature-raising space S1 is adjacent to the exhaust part 110 to communicate with the exhaust part 110.

The temperature-maintaining space S2 communicates with the temperature-raising space S1 and the cooling space S3 between the temperature-raising space S1 and the cooling space S3.

The temperature of the temperature-maintaining space S2 is higher than the temperature of the temperature-raising space S1 and the temperature of the cooling space S3.

The cooling space S3 is adjacent to the air supply part 120 to communicate with the air supply part 120.

In the firing space 130, the positive electrode material CM for the secondary battery moves in a vertical direction. In the firing space 130, the positive electrode material CM for the secondary battery moves from the upper portion to the lower portion of the firing space 130, and the gas GA moves from the lower portion to the upper portion of the firing space 130. In other words, the positive electrode material CM for the secondary battery moves through the temperature-raising space S1, the temperature-maintaining space S2, and the cooling space S3 sequentially in the vertical direction in the firing space 130, and the gas GA moves through the cooling space S3, the temperature-maintaining space S2, the temperature-raising space S1 sequentially in the vertical direction in the firing space 130.

The cylinder-type heat insulating material 160 forms the air supply part 120, the exhaust part 110, and the firing space 130. The exhaust part 110 is formed at the upper portion of the cylinder-type heat insulating material 160, the air supply part 120 is formed at the lower portion of the cylinder-type heat insulating material 160, and the firing space 130 is formed in the cylinder-type heat insulating material 160. The diameter of the firing space 130 is greater than the diameter of the exhaust part 110 and the diameter of the air supply part 120. Since the diameter of the firing space 130 is greater than the diameter of the exhaust part 110 and the diameter of the air supply part 120, the positive electrode material CM for the secondary battery put into the exhaust part 110 is dispersed in a large area in the firing space 130, so that carbon dioxide gas discharged from the positive electrode material CM for the secondary battery is easily discharged to the exhaust part 110 by the gas GA moving from the lower portion to the upper portion of the firing space 130. The cylinder-type heat insulating material 160 has a cylindrical shape, but is not limited thereto and may have a polygonal pillar shape.

The inner wall 170 faces the firing space 130 in the cylinder-type heat insulating material 160. The inner wall 170 is exposed to the firing space 130. The inner wall 170 may be in contact with the positive electrode material CM for the secondary battery, and a surface-treatment layer such as fluorine coating may be formed on a surface of the inner wall 170 in contact with the positive electrode material CM for the secondary battery. The inner wall 170 is positioned between the cylinder-type heat insulating material 160 and the firing space 130, and prevents contamination of the positive electrode material CM for the secondary battery due to interference between the cylinder-type heat insulating material 160 and the positive electrode material CM for the secondary battery in the firing space 130.

The heater 200 heats the firing space 130 of the vertical-type firing furnace 100. The heater 200 may heat only the temperature-maintaining space S2 corresponding to the temperature-maintaining space S2, but is not limited thereto. The heater 200 is positioned inside the inner wall 170 corresponding to the temperature-maintaining space S2.

Figure 5:
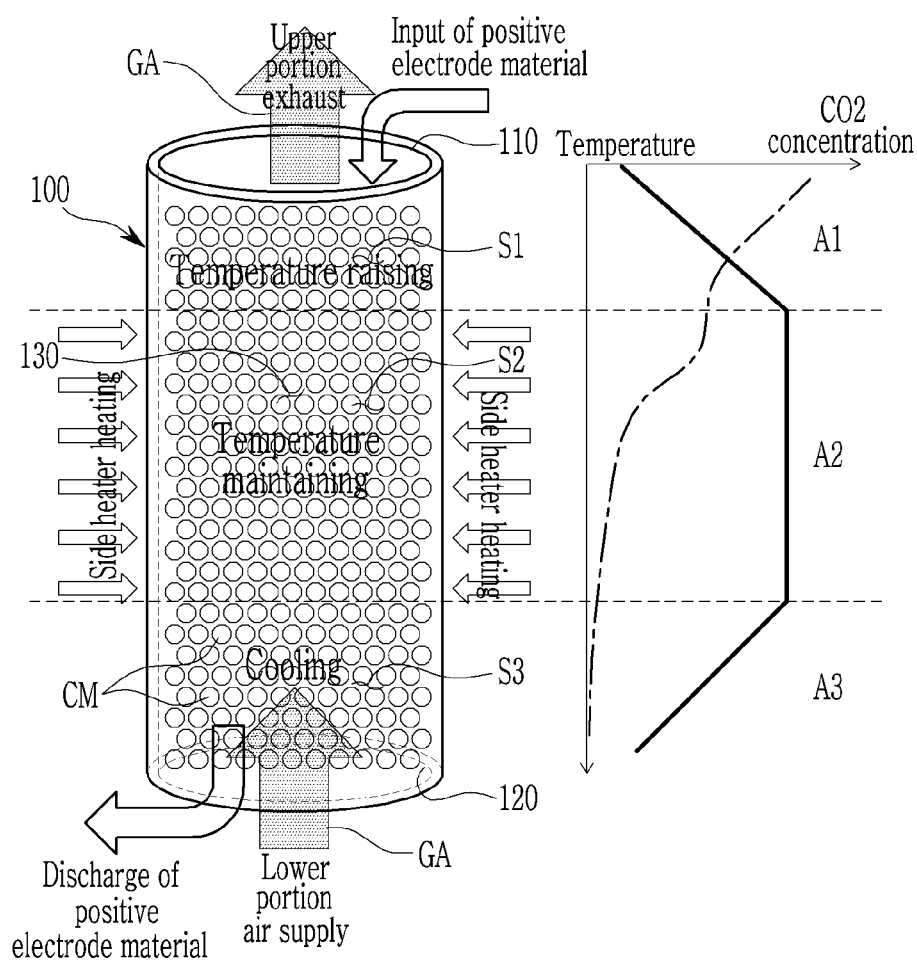
FIG. 5 shows a drawing and a graph illustrating an effect of a vertical-type firing apparatus of a positive electrode material for a secondary battery according to another exemplary embodiment.

FIG. 5 is a drawing and a graph for describing the effect of the vertical-type firing apparatus of the positive electrode material for the secondary battery according to another exemplary embodiment. (A) of FIG. 5 is a drawing illustrating a vertical-type firing furnace of the vertical-type firing apparatus of the positive electrode material for the secondary battery according to another exemplary embodiment. (B) of FIG. 5 is a graph showing the temperature and carbon dioxide concentration according to the vertical height of the firing space of the vertical-type firing furnace, wherein the x-axis represents the temperature and carbon dioxide concentration, and the y-axis represents the vertical height of the firing space of the vertical-type firing furnace.

Referring to (A) of FIG. 5, the positive electrode material CM for the secondary battery in the vertical-type firing furnace 100 is charged into the firing space 130 in the form of granules or briquettes in a vertical direction and moves from the upper portion to the lower portion of the firing space 130. The gas GA supplied through the air supply part 120 of the vertical-type firing furnace 100 moves from the lower portion to the upper portion of the firing space 130 to be discharged to the exhaust part 110. Since all the total flow rate of the gas GA moving from the lower portion to the upper portion of the firing space 130 come in contact with the positive electrode material CM for the secondary battery moving from the upper portion to the lower portion of the firing space 130, the process of firing the positive electrode material CM for the secondary battery is completed only with a very small flow rate of gas. Such reduction in the gas supply reduces not only the gas cost but also the energy cost for heating the gas. In addition, since all the total flow rate of the gas GA supplied to the firing space 130 passes around the positive electrode material CM for the secondary battery, carbon dioxide gas generated from the positive electrode material CM for the secondary battery is easily discharged through the exhaust part 110. Thus, it is easy to control the firing reaction, thereby ultimately improving the firing quality of the positive electrode material CM for the secondary battery. In addition, due to the environment favorable for the firing reaction, derived are the effects such as an increase in the charging amount of the positive electrode material CM for the secondary battery and the reduction in the firing time, thereby reducing the firing cost due to an increase in the firing productivity.

Referring to (A) and (B) of FIG. 5, even if the heater heats only the temperature-maintaining space S2 in the firing space 130 corresponding to the temperature- maintaining space S2, the temperature of the temperature-raising space S1 may further be increased compared to the temperature-maintaining space S2 due to heat transfer in the firing space 130 by the gas GA moving from the lower portion to the upper portion of the firing space 130. However, a heat balance is generated in the firing space 130 by the positive electrode material CM for the secondary battery moving from the upper portion to the lower portion of the firing space 130 in a direction opposite to the moving direction of the gas GA, thereby forming a temperature profile similar to the predetermined temperature in the firing space 130. Due to the formation of the temperature profile similar to the predetermined temperature in the firing space 130, most of the carbon dioxide gas is generated from the positive electrode material CM for the secondary battery in the temperature-raising space S1 positioned at the upper portion of the firing space 130, and the carbon dioxide gas is easily discharged to the upper portion of the firing space 130.

In other words, there is provided a vertical-type firing apparatus of a positive electrode material for a secondary battery, which improves discharge of carbon dioxide gas generated from the positive electrode material for the secondary battery and improves firing reaction of the positive electrode material for the secondary battery by simplifying the supply of the external gas and exhaust of the internal gas in the vertical direction and also simplifying input of an external positive electrode material for the secondary battery and discharge of the internal positive electrode material for the secondary battery in the vertical direction while increasing the flow rate of gas supplied to the positive electrode material for the secondary battery.

In addition, there is provided a vertical-type firing apparatus of a positive electrode material for a secondary battery, which fires the positive electrode material for the secondary battery with improved firing quality.

In addition, there is provided a vertical-type firing apparatus of a positive electrode material for a secondary battery, in which the firing productivity is increased and the firing cost is reduced due to an increase in a charging amount of the positive electrode material for the secondary battery fired in the firing space and reduction in firing time.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

Exhaust part 110, Air supply part 120, Firing space 130, Vertical-type firing furnace 100, Heater 200, Temperature-raising space S1, Cooling space S3, Temperature-maintaining space S2.

The invention claimed is:

1. A vertical-type firing apparatus for a positive electrode material for a secondary battery for firing the positive electrode material for the secondary battery by moving the positive electrode material in a vertical direction, the vertical-type firing apparatus comprising:
a vertical-type firing furnace comprising an exhaust part positioned in an upper portion and through which internal gas is exhausted, an air supply part positioned in a lower portion and through which external gas is supplied, and a firing space positioned between the exhaust part and the air supply part and extending in the vertical direction; and
a heater configured to heat the firing space in the vertical-type firing furnace,
wherein the positive electrode material for the secondary battery is put into the exhaust part and discharged from the air supply part through the firing space,
wherein the positive electrode material for the secondary battery is accommodated in a plurality of saggers stacked in the vertical direction in the firing space, with each of the plurality of saggers comprising one or more through-type slits at a bottom,
wherein, for every sagger that is not a first sagger, the internal gas generated during the firing of the positive electrode material for the secondary battery is exhausted from the respective sagger through the one or more through-type slits at the bottom of a sagger above the respective sagger,
wherein the firing space comprises a temperature-raising space communicating with the exhaust part, a cooling space communicating with the air supply part, and a temperature-maintaining space communicating with the temperature-raising space and the cooling space, the temperature-maintaining space between the temperature-raising space and the cooling space,
wherein temperature of the temperature-maintaining space is higher than the temperature of the temperature-raising space and the temperature of the cooling space,
wherein an amount of carbon dioxide gas generated from the positive electrode material in the temperature-raising space is greater than an amount of carbon dioxide gas generated from the positive electrode material in the temperature-maintaining space,
wherein the vertical-type firing furnace further comprises a rectangular pillar-shaped heat insulating material that extends integrally in the vertical direction to form the air supply part, the exhaust part, and the firing space,
wherein the heater is positioned inside the rectangular pillar-shaped heat insulating material to correspond to the temperature-maintaining space,
wherein the heater heats only the temperature-maintaining space, and
wherein a heat balance is generated in the firing space by the positive electrode material moving from an upper portion to a lower portion of the firing space in a direction opposite to the moving direction of the gas.

2. The vertical-type firing apparatus of claim 1, wherein:
and the vertical-type firing apparatus further comprises:
an input part adjacent to the exhaust part and configured to put the first sagger positioned on the uppermost layer among the plurality of saggers into the exhaust part; and
a discharge part adjacent to the air supply part and configured to discharge a second sagger positioned on the lowermost layer among the plurality of saggers from the air supply part.

3. The vertical-type firing apparatus of claim 2, wherein:
the input part comprises:
a first roller configured to transfer the first sagger to the discharge part; and
a first pusher configured to push the first sagger on the first roller to the exhaust part, and the discharge part comprises:
a stopper configured to support a second to last sagger positioned on a last sagger among the plurality of saggers;
a supporter configured to support the last sagger discharged from the air supply part;
a second roller adjacent to the supporter; and
a second pusher configured to push the last sagger on the supporter onto the second roller.

4. The vertical-type firing apparatus of claim 1, wherein:
the positive electrode material for the secondary battery is in the form of granules or briquettes.

* * * * *